US009122432B1

(12) United States Patent
Granby et al.

(10) Patent No.: US 9,122,432 B1
(45) Date of Patent: Sep. 1, 2015

(54) DETECTION OF A FLOATING SIGNATURE ON A SIGNATURE PAGE OF AN ELECTRONIC DOCUMENT PRIOR TO PRINTING

(71) Applicant: Xerox Corporation, Norwalk, CT (US)

(72) Inventors: Peter Granby, Hertfordshire (GB); Stephen Foster, Hertfordshire (GB); Wayne Rudge, Berkshire (GB); Richard Bradford, Hertfordshire (GB); John A. Kerslake, Hertfordshire (GB); Christopher D. Olliffe, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/174,895

(22) Filed: Feb. 7, 2014

(51) Int. Cl.
*G06F 3/12* (2006.01)

(52) U.S. Cl.
CPC ............ *G06F 3/1265* (2013.10); *G06F 3/1268* (2013.01); *G06F 3/1274* (2013.01); *G06F 3/1285* (2013.01)

(58) Field of Classification Search
CPC ... G06F 3/1219; G06F 3/1222; G06F 3/1238; G06F 3/1273; G06F 3/1288; G06K 15/1867; G06T 1/0021; G06T 1/005; G06T 2201/0051; G06T 2201/0064; H04N 1/0087; H04N 1/00883
USPC .................................................. 358/1.1, 1.15
See application file for complete search history.

(56) References Cited

U.S. PATENT DOCUMENTS

| 5,550,614 | A | 8/1996 | Motoyama |
| 5,963,641 | A | 10/1999 | Crandall et al. |
| 7,161,711 | B2 | 1/2007 | Mori et al. |
| 7,249,319 | B1 | 7/2007 | Payne et al. |
| 7,453,595 | B2 | 11/2008 | Natori |
| 7,689,431 | B1 * | 3/2010 | Carmel et al. ................. 705/1.1 |
| 7,773,242 | B2 | 8/2010 | Morales |
| 8,125,693 | B2 | 2/2012 | Arai |
| 8,284,459 | B2 | 10/2012 | Matsushita et al. |
| 2004/0012806 | A1 | 1/2004 | Murata |
| 2006/0290948 | A1 * | 12/2006 | Ferlitsch ....................... 358/1.1 |
| 2007/0101263 | A1 * | 5/2007 | Bedingfield ................. 715/526 |
| 2011/0096372 | A1 * | 4/2011 | Crucs ........................... 358/474 |
| 2012/0114361 | A1 | 5/2012 | Nagai |
| 2012/0284591 | A1 | 11/2012 | Seed et al. |
| 2013/0155436 | A1 | 6/2013 | Gaertner et al. |
| 2014/0181528 | A1 * | 6/2014 | Ram ............................ 713/176 |
| 2014/0185934 | A1 * | 7/2014 | Lukehart ..................... 382/182 |

FOREIGN PATENT DOCUMENTS

WO 0152108 A2 7/2001

* cited by examiner

*Primary Examiner* — Iriana Cruz
(74) *Attorney, Agent, or Firm* — Gibb & Riley, LLC

(57) ABSTRACT

Disclosed are devices, including both a front-end computerized device used to submit a print job and a printing device receiving a print job, that can detect a floating signature on the signature page of an electronic document in the print job and can halt printing of that print job until further action is taken by a user. The devices can apply a set of heuristics to analyze the electronic document in order to determine whether it has a signature page and, if so, whether the signature page contains a floating signature. When a floating signature is detected, the device can notify a user and can preclude printing of the print job until such time as a response to the notification is received. Also disclosed herein are associated methods for detecting a floating signature and for halting printing of a print job until further action is taken.

22 Claims, 9 Drawing Sheets

DETECTION OF A FLOATING SIGNATURE ON A SIGNATURE PAGE OF AN ELECTRONIC DOCUMENT PRIOR TO PRINTING

BACKGROUND

Devices and methods disclosed herein generally relate to image processing and, more particularly, to detection of a floating signature (i.e., a widowed signature) on a signature page of an electronic document, such as a letter, prior to printing.

More particularly, when a signed document (e.g., a letter or contract) is prepared such that its signature page contains a floating signature (i.e., a widowed signature), that signature page could, subsequently, be incorporated into a different text document for fraudulent purposes. For purposes of this disclosure, a "floating signature" or a "widowed signature" refers to a signature block (e.g., a signature line and associated text, such as signer's identification information) presented on the signature page of a document without additional document-specific text capable of distinguishing the signature page so that it could not be readily incorporated into a different document with the same signer(s). Thus, for security purposes (i.e., in order to prevent fraudulent use of a signature page), organizations, such as law firms, have established policies against the preparation and printing of any document wherein the signature page contains a floating signature. Given such policies, the person responsible for preparing a document can attempt to avoid the occurrence of a signature page with a floating signature using one or more different word processing commands (e.g., insert page break, keep together, etc.) during the preparation of an electronic document. However, situations often occur when these commands are not used and/or they are not properly used such that a hard copy of the electronic document is printed with a signature page containing a floating signature. Thus, there is a need in the art for devices and methods for detecting a floating signature (i.e., a widowed signature) on a signature page of a text document (e.g., a letter) prior to printing.

SUMMARY

In view of the foregoing, disclosed herein are devices, including both a computerized device used to submit a print job to a printing device for printing and a printing device receiving a print job to be printed. These devices can detect a floating signature (i.e., a widowed signature) on the signature page of an electronic document in the print job and can halt printing of that print job until further action is taken. Specifically, these devices can apply a set of heuristics to analyze an electronic document in a print job in order to determine whether it has a signature page and, if so, to whether the signature page contains a floating signature. When a floating signature is detected, the device can notify a user and can preclude printing of the print job until such time as a response to the notification is received. Also disclosed herein are associated methods for detecting a floating signature (i.e., a widowed signature) on the signature page of an electronic document in a print job and for halting printing of that print job until further action is taken.

More particularly, disclosed is a computerized device and, particularly, a front-end computerized device, which is configured to allow a user to submit a print job to a printing device for printing and which can detect a floating signature (i.e., a widowed signature) on a signature page of an electronic document in the print job and, if necessary, can halt release of that print job to the printing device until further action is taken.

Specifically, this computerized device can comprise at least a memory, which stores a set of heuristics for analyzing a print job, a display screen and a processor in communication with the memory and the display screen. The processor can access the set of heuristics and can apply the set of heuristics to a print job, which has been submitted by a user and which contains an electronic document, in order to analyze the electronic document prior to its release to the printing device. This analysis can be performed in order to determine whether the electronic document has a signature page and, if so, to further determine whether the signature page contains a floating signature (i.e., a signature block on the signature page without additional document-specific text to distinguish that signature page and, thereby prevent the fraudulent use of that signature page). For example, the set of heuristics can comprise a data mining software program that specifies investigative process steps, which are provided in the form of a decision tree and which can be executed by the processor in order to mine the text data of the electronic document in order to ultimately determine whether that electronic document contains a floating signature.

When the electronic document is devoid of either a signature page or a floating signature, the processor can automatically release the print job to the printing device. However, when the electronic document has a signature page and that signature page contains a floating signature, the processor can cause the display screen to display a notification of the floating signature to the user and can preclude release of the print job to the printing device until further action has been taken by the user in response to the notification.

Also disclosed herein is a printing device, which can receive a print job for printing and which can detect a floating signature (i.e., a widowed signature) on a signature page of an electronic document in the print job and, if necessary, can halt release of that print job to its print engine until further action is taken.

Specifically, this printing device can comprise at least a memory, which stores a set of heuristics for analyzing a print job, a print engine, an output device and a processor in communication with the memory, the print engine and the output device. The processor can receive a print job, which has been submitted by a user via a computerized device (e.g., over a wired or wireless network) and which contains an electronic document. The processor can then access the set of heuristics and can apply the set of heuristics to the print job. The set of heuristics can specifically be applied in order to analyze the electronic document prior to its release to the print engine for printing. This analysis can be performed to determine whether the electronic document has a signature page and, if so, to further determine whether the signature page contains a floating signature (i.e., a signature block on the signature page without additional document-specific text to distinguish that signature page and, thereby prevent the fraudulent use of that signature page). For example, the set of heuristics can comprise a data mining software program that specifies investigative process steps, which are provided in the form of a decision tree and which can be executed by the processor in order to mine the text data of the electronic document in order to ultimately determine whether that electronic document contains a floating signature.

When the electronic document is devoid of either a signature page or a floating signature, the processor can automatically release the print job to the print engine. However, when the electronic document has a signature page and that signature page contains a floating signature, the processor can cause the output device to output a notification of the floating signature to the user and can preclude release of the print job to the print engine until further action is taken by the user in response to the notification.

Also disclosed herein is a method, which be implemented by a computerized device to detect a floating signature (i.e., a widowed signature) on a signature page of an electronic document in a print job submitted by a user and, if necessary, to halt release of that print job to a printing device until further action is taken.

Specifically, the method can comprise storing (e.g., in a memory of the computerized device) a set of heuristics that can be accessed by a processor of the computerized device. The method can further comprise applying (e.g., by the processor) the set of heuristics to a print job, which has been submitted by a user and which contains an electronic document. The set of heuristics can specifically be applied in order to analyze the electronic document prior to its release to the printing device. This analysis process can be performed in order to determine whether the electronic document has a signature page and, if so, to further determine whether the signature page contains a floating signature (i.e., a signature block on the signature page without additional document-specific text to distinguish that signature page and, thereby prevent the fraudulent use of that signature page).

The method can further comprise automatically releasing (e.g., by the processor) the print job to the printing device, when the electronic document is devoid of either a signature page or a floating signature. However, when the electronic document has a signature page and that signature page contains a floating signature, the method can comprise displaying (e.g., by a display screen of the computerized device as caused by the processor) a notification of the floating signature to the user and precluding (e.g., by the processor) release of the print job to the printing device until further action is taken by the user in response to the notification.

Also disclosed herein is an associated method that can be implemented by a printing device to detect a floating signature (i.e., a widowed signature) on the signature page of an electronic document in a print job received by the printing device and, if necessary, to halt the release of that print job to a print engine of the printing device until further action is taken.

Specifically, this method can comprise storing (e.g., in a memory of the printing device) a set of heuristics, which can, for example, be accessed by a processor of the printing device. The method can further comprise receiving (e.g., by the processor) a print job, which has been submitted by a user via a computerized device (e.g., over a wired or wireless network) and which contains an electronic document. The method can further comprise applying (e.g., by the processor) the set of heuristics to the print job in order to analyze the electronic document contained therein prior to releasing the print job to the print engine for printing. This analysis can be performed to determine whether the electronic document has a signature page and, if so, to further determine whether the signature page contains a floating signature (i.e., a signature block on the signature page without additional document-specific text to distinguish that signature page and, thereby prevent the fraudulent use of that signature page).

The method can further comprise automatically releasing (e.g., by the processor) the print job to the print engine of the printing device, when the electronic document is devoid of either a signature page or a floating signature. However, when the electronic document has a signature page and that signature page contains a floating signature, the method can comprise outputting (e.g., by an output device as caused by the processor) a notification of the floating signature to a user and precluding (e.g., by the processor) release of the print job to the print engine until further action is taken by the user in response to the notification.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, when a signed document (e.g., a letter or contract) is prepared such that its signature page contains a floating signature (i.e., a widowed signature), that signature page could, subsequently, be incorporated into a different text document for fraudulent purposes. For purposes of this disclosure, a "floating signature" or a "widowed signature" refers to a signature block (e.g., a signature line and associated text, such as signer's identification information) presented on the signature page of a document without additional document-specific text capable of distinguishing the signature page so that it could not be readily incorporated into a different document with the same signer(s). Thus, for security purposes (i.e., in order to prevent fraudulent use of a signature page), organizations, such as law firms, have established policies against the preparation and printing of any document wherein the signature page contains a floating signature. Given such policies, the person responsible for preparing a document can attempt to avoid the occurrence of a signature page with a floating signature using one or more different word processing commands (e.g., insert page break, keep together, etc.) during the preparation of an electronic document. However, situations often occur when these commands are not used and/or they are not properly used such that a hard copy of the electronic document is printed with a signature page containing a floating signature. Thus, there is a need in the art for devices and methods for detecting a floating signature (i.e., a widowed signature) on a signature page of a text document (e.g., a letter) prior to printing.

In view of the foregoing, disclosed herein are devices, including both a computerized device used to submit a print job to a printing device for printing and a printing device receiving a print job to be printed. These devices can detect a floating signature (i.e., a widowed signature) on the signature page of an electronic document in the print job and can halt printing of that print job until further action is taken. Specifically, these devices can apply a set of heuristics to analyze an electronic document in a print job in order to determine whether it has a signature page and, if so, to whether the signature page contains a floating signature. When a floating signature is detected, the device notifies a user and can preclude printing of the print job until such time as a response to the notification is received. Also disclosed herein are associated methods for detecting a floating signature (i.e., a widowed signature) on the signature page of an electronic document in a print job and for halting printing of that print job until further action is taken.

Figure 1:
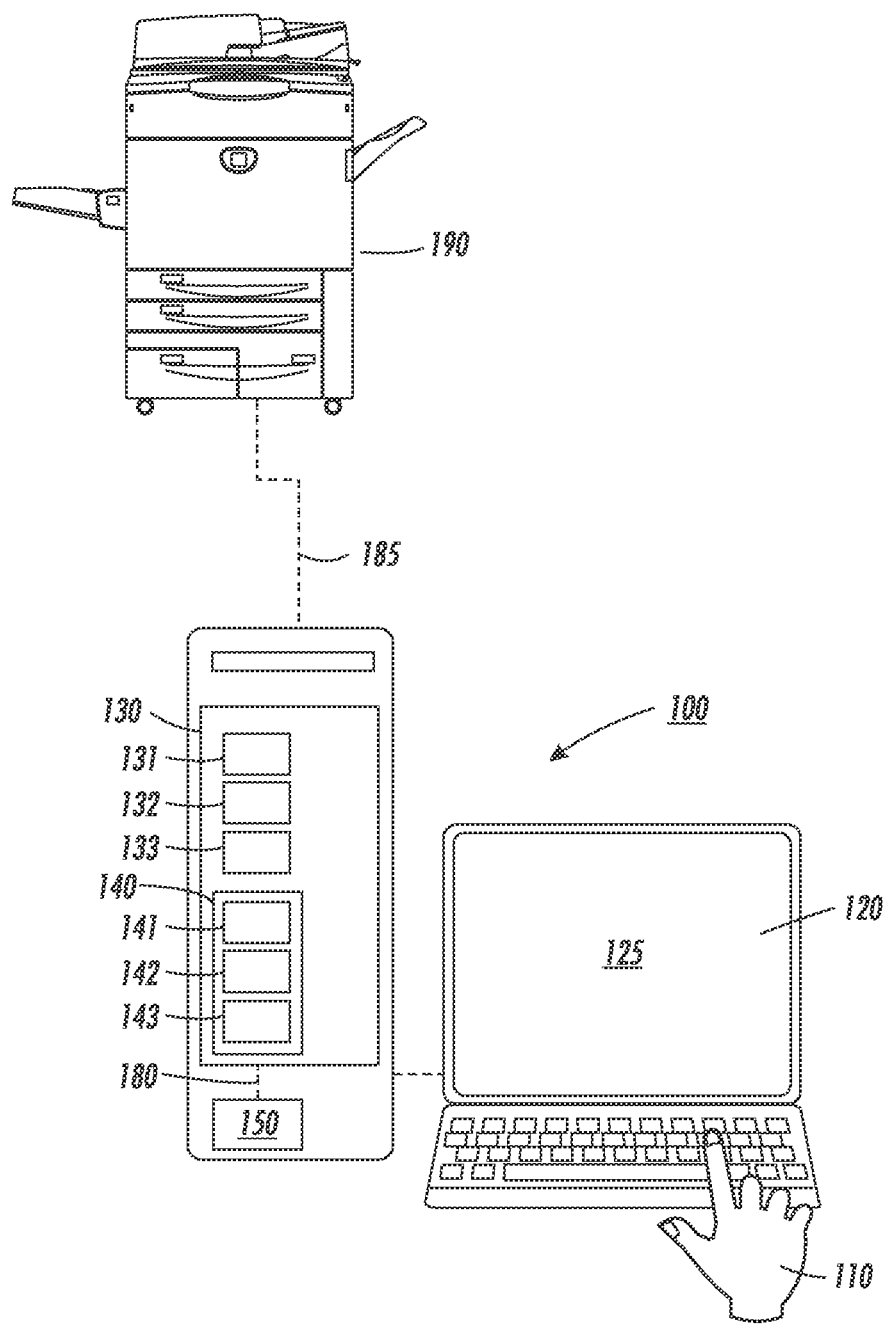
FIG. 1 is a schematic diagram illustrating a computerized device having a floating signature detection function.

More particularly, referring to FIG. 1, disclosed is a computerized device 100 and, particularly, a front-end computerized device, which is configured to allow a user to submit a print job to a printing device 190 for printing and which can detect a floating signature (i.e., a widowed signature) on a signature page of an electronic document in the print job and, if necessary, can halt release of that print job to the printing device 190 until further action is taken. For purposes of illustration, this computerized device 100 is shown in FIG. 1 as a desktop computer. However, it should be understood that this computerized device 100 could, alternatively, comprise any other type of computerized device having software application(s) with a print function that allows a user to submit a print job to a printing device 190 for printing. Such computerized device can include, but are not limited to, desktop computers, laptop computers, personal computers, tablet computers, netbooks, or personal digital assistants (PDAs) (i.e., smart phones).

In any case, this computerized device 100 can be in communication with a printing device 190 (e.g., over a wired or wireless network 185) and can comprise at least a memory 130, a display screen 120, and a processor 150 (e.g., a central processing unit (CPU)) in communication with the memory 130 and the display screen 120 (e.g., over a system bus 180).

The memory 130 can store various software applications, which can be accessed and executed by the processor 150. These software applications can include, but are not limited to, one or more software applications 131 having a print function allowing a print job to be submitted to a printing device 190 as well as a printer driver 132 and print spooler 133 associated with the printing device 190. Such software applications are well known in the art and, thus, the details are omitted from this specification in order to allow the reader to focus on the salient aspects of the disclosed devices and methods. However, those skilled in the art will recognize that a print process typically proceeds as follows. A user 110 will select the print function within a given software application and, in response, will be presented with a graphical user interface (GUI) window, which allows the user to select print options (e.g., the printing device, the number of copies, the quality, etc.), and which further allows the user to enter the print command resulting in generation of a print job. The printer driver 132 will then convert that print job into a data format, which is specific to the printing device 190, and the print spooler 133 will place the print job in a print queue for subsequent release to the printing device 190.

The memory 130 can further store a set of heuristics 140, which can be accessed and executed by the processor 150 for implementing a floating signature detection function. For purposes of this disclosure, the "set of heuristics" 140 refers specifically to a data mining software program that specifies investigative process steps, which are provided in the form of a decision tree and which can be executed by the processor 150 in order to mine the text data of an electronic document in order to ultimately determine whether that electronic document contains a floating signature. As mentioned above, a "floating signature" or a "widowed signature" refers to a signature block (e.g., a signature line and associated text, such as the signer's identification information) presented on the signature page of a document without additional document-specific text capable of distinguishing the signature page so that it could not be readily incorporated into a different document. In a letter, this situation can occur, for example, when a page break occurs immediately prior to the valediction (also referred to as the complimentary closing) and when no Post Script (P.S.) text is provided. This floating signature detection function can, for example, be incorporated as an option in printing device set up on the computerized device 100 and, when enabled, can be automatically triggered upon entry of a print command. Alternatively, the floating signature detection function can be incorporated as an option in print queue management and, when enabled, can be automatically triggered upon placement of the print job in the print queue. In either case, the floating signature detection function can require selective enablement or, alternatively, can be enabled by default and require selective disablement.

In any case, when the floating signature detection function is enabled on a computerized device 100 and a user 110 submits a print job, which contains an electronic document, the processor 150 can access the set of heuristics 140 and can apply the set of heuristics 140 to the print job prior to release of the print job to the printing device 190 for printing. Specifically, the set of heuristics 140 can comprise multiple sub-sets (e.g., a first sub-set 141, a second sub-set 142 and a third sub-set 143) and can be applied as follows in order to determine whether the electronic document has a signature page and, if so, to further determine whether the signature page contains a floating signature (i.e., a signature block on the signature page without additional document-specific text to distinguish that signature page and, thereby prevent the fraudulent use of that signature page).

The processor 150 can apply the first sub-set 141 of the set of heuristics 140 in order to identify the electronic document within the print job as a specific type of document (e.g., a letter or contract) requiring a signature, based on known text and/or formatting characteristics of one or more initial components typically found on the first page of that specific type of document. If the electronic document is a specific type of document that requires a signature, then the processor 150 can apply the second sub-set 142 of the set of heuristics 140 to identify the signature page within the electronic document, based on known text and/or formatting characteristics of one or more final components typically found on the signature page in that specific type of document. Once the signature page is identified, the processor 150 can apply the third sub-set 143 of the set of heuristics 140 to determine whether the signature page contains a floating signature, based on the known text and/or formatting characteristics of the closing components typically found on the signature page in that specific type of document.

Since the components of different types of documents vary, the set of heuristics 140 will be different for different types of documents. The following is a more detailed example of the set of heuristics 140 that can be used in the case of letters. Specifically, the processor 150 can apply the first sub-set 141 of the set of heuristics 140 in order to identify the electronic document within the print job as a letter, based on known text and/or formatting characteristics of, for example, salutations typically found on the first page of letters. That is, the first page of a letter typically has a salutation and such salutations have known text characteristics (e.g., "Dear [Name],"; "Hi [Name],"; "Dearest [Name],"; "To whom it may concern,"; etc.,) and also known formatting characteristics (e.g., capitalized, placement at the left margin, etc.) within letters. A list of such salutations and formatting for such salutations can be contained in the first sub-set 141 of the set of heuristics 140 stored in the memory 130 and application of the first sub-set 141 of the set of heuristics 140 can comprise comparing the text data on the first page of the electronic document to the list of salutations and, if a match is found between a phrase within the text data and one of the salutations on the list and (optionally for a more accurate identification) if that phrase has the required formatting (e.g., capitalization and placement), then the electronic document can be identified as a letter.

The use of salutations, as described above, is not intended to be limiting. The first pages of letters also typically have other initial components (e.g., the letter head of the sender, the address of the addressee, a regarding or attention line, etc.) and these other initial components also have known text and/or formatting characteristics. Thus, the comparison of the text data on the first page of the electronic document to the known text and/or formatting characteristics of these other initial components can, additionally or alternatively, be used to identify the electronic document as a letter.

If the electronic document is a letter, then the processor 150 can apply the second sub-set 142 of the set of heuristics 140 to identify the signature page of the letter from amongst all pages in the letter, based on known text and/or formatting characteristics of, for example, valedictions (also referred to herein as complimentary closings) typically found on the signature page of letters. That is, the signature page of a letter typically has a valediction and such valedictions have known text characteristics (e.g., "Sincerely,"; "Yours truly,"; "Respectfully,"; "Best Regards,"; etc.,) and also known formatting characteristics (e.g., capitalized, placement along the centerline of the document, etc.). A list of such valedictions and formatting for such valedictions can be contained in the second sub-set 142 of the set of heuristics 140 stored in the memory 130 and application of the second sub-set 142 of the set of heuristics 140 can comprise comparing the text data on all pages of the electronic document to the list of valedictions and, if a match is found between a phrase within the text data and one of the valedictions on the list and (optionally for a more accurate identification) if that phrase has the required formatting (e.g., capitalization and placement), then the page on which the phrase is found can be identified as the signature page.

The use of valedictions, as described above, is not intended to be limiting. The signature page of a letter also typically has other final components (e.g., a signature block following the valediction, an enclosure indicator, a copies indicator, etc.) (also referred to herein as letter signature page components) and these other letter signature page components also have known text and/or formatting characteristics. For purpose of this disclosure, the signature block refers to the space following the valediction within which the sender can sign a letter as well as the sender's identification information (e.g., name, address, telephone number(s), email address and/or any other identification information). The comparison of the text data on all the pages of the electronic document to the known text and/or formatting characteristics of these other letter signature page components can, additionally or alternatively, be used to identify the signature page of the letter.

Once the signature page is identified, the processor 150 can apply the third sub-set 143 of the set of heuristics 140 to determine whether the signature page contains a floating signature based on the known text and/or formatting characteristics of the letter signature page components, as described above. That is, as mentioned above, the signature page of a letter typically has multiple signature page components, including the valediction, the signature block, an enclosure indicator, a copies indicator, etc. and these letter signature page components have known text and/or formatting characteristics. Application of the third sub-set 141 of the set of heuristics 140 can comprise comparing the text data on the signature page of the letter to a list of letter signature page components and the known text and/or formatting characteristics of the components on that list and, if all of the text on the signature pages matches the known text and formatting data of letter signature page component on the list such that none of the text on the signature page is distinguishing text, then a determination can be made that the signature page of the letter contains a floating signature. That is, if there is no other text on the signature page than text which corresponds to the components on the list and, thereby no other document-specific text which could distinguish that signature page such that it could not fraudulently be incorporated into a different document, then a determination can be made that the signature page of the letter contains a floating signature.

Figure 2:
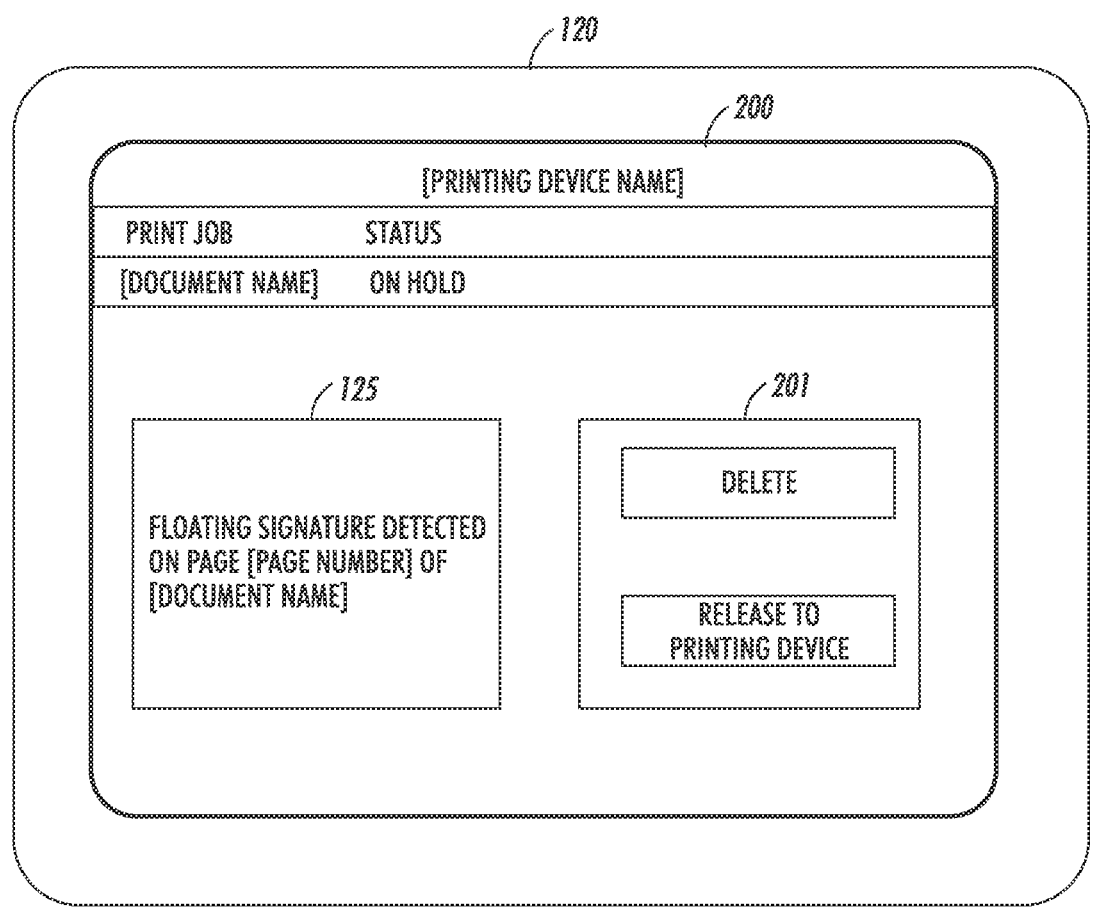
FIG. 2 is a schematic diagram illustrating an exemplary display screen of a computerized device displaying a detected floating signature notification.

When the electronic document has a signature page and that signature page contains a floating signature, the processor 150 can cause the display screen 120 to display a notification 125 of the floating signature to the user 110 and can preclude release of the print job to the printing device 190, by placing the print job in an "on hold" status, until further action is taken by the user 110 in response to the notification 125. For example, as illustrated in FIG. 2, the display screen 120 can display a notification 125 in a graphical user interface window 200. This graphical user interface window 200 can indicate, for example, the name of the printing device 190, the name of the print job (e.g., the name of the electronic document to be printed), the status of the print job (e.g. on hold) and a notification 125 setting forth the reason why the print job is in an on hold status (i.e., stating that a floating signature was detected). Optionally, the notification 125 can give additional details about the floating signature (e.g., the page number on which it was found). In response to the notification 125, the user 110 can cancel (i.e., delete) the print job, make the necessary corrections to the electronic document to remove the floating signature, and resubmit the print job. Alternatively, the user 110 can release the print job for printing (i.e., override the on-hold status). Optionally, these options (namely, deleting the print job or releasing the print job to the printing device 190) can be presented to the user 110 as selectable options 201 within the graphical user interface window 200.

It should be noted that, if a determination is made during the application of the first sub-set 141 of the set of heuristics 140 that the electronic document is not a type of document that requires a signature (e.g., not a letter or contract) or if a determination is made during the application of the third sub-set 143 of the set of heuristics 140 that the signature page does not contain a floating signature, then the processor 150 can automatically release the print job to the printing device 190 for printing. That is, when the electronic document is determined to be devoid of either a signature page or a floating signature, the processor 150 can automatically release the print job to the printing device 190 for printing.

It should further be noted that, optionally, the lists of known text and/or formatting characteristics of the different components of a given type of document (e.g., the list of salutations, the list of valedictions, etc.), which contained in the set of heuristics to identify the type of electronic document, to identify a signature page in an electronic document requiring a signature and to further detect a floating signature on a signature page, can be supplemented by a user 110 to account for unique local or professional vernacular.

Figure 3:
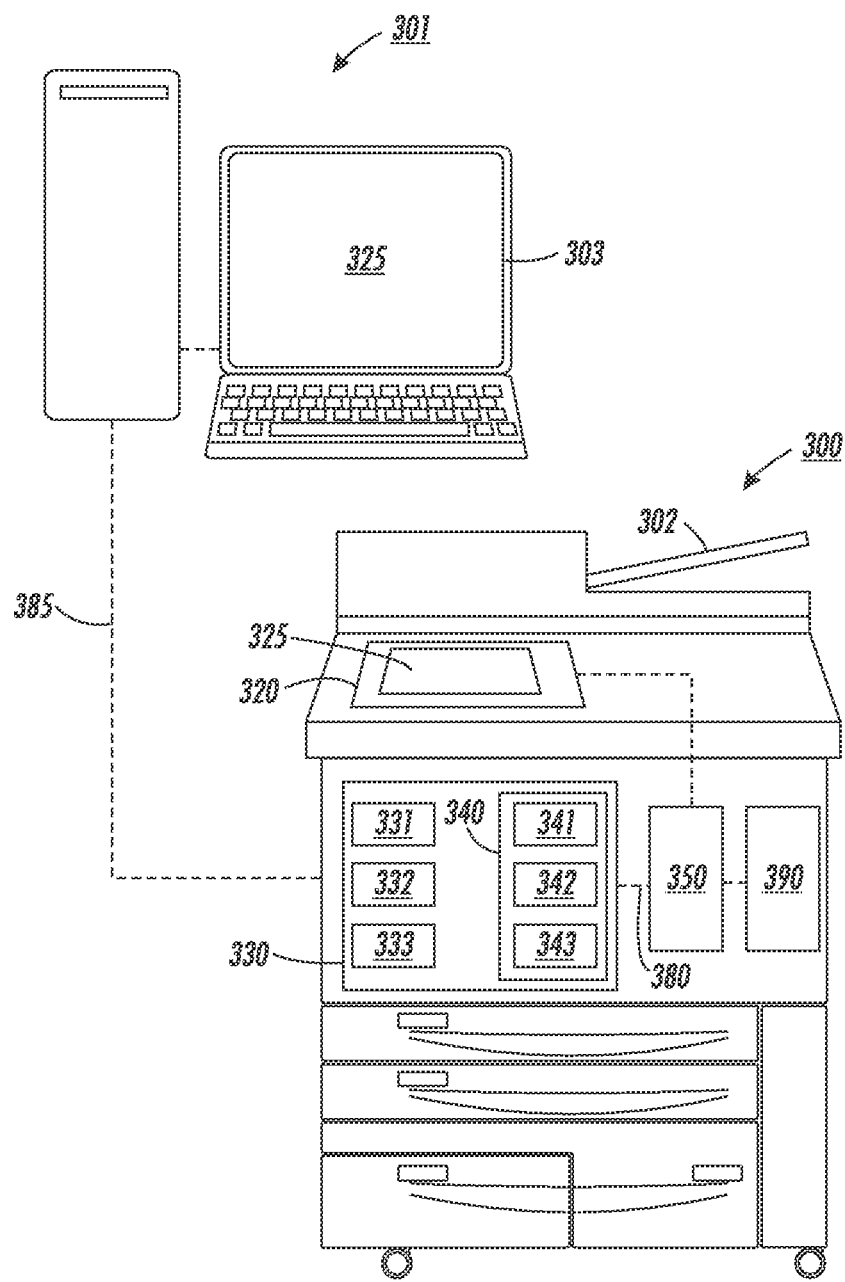
FIG. 3 is a schematic diagram illustrating a printing device having a floating signature detection function.

Referring to FIG. 3, also disclosed herein is a printing device 300 (i.e., a printer, a copier, a multi-function device, etc.), which can receive a print job for printing. For example, the printing device 300 can receive a print job, which contains an electronic document, from a computerized device 301 (e.g., a desktop computer, laptop computer, personal computer, tablet computer, netbook, PDA, print server, etc.) over a wired or wireless network 385. If, however, the printing device 300 comprises a copier, a scanner, a multi-function device or any other such device with document handling functions 302, the print job could also be received through the document handling function 302 (e.g., when a hardcopy of a document is scanned in, an electronic document corresponding to the hardcopy is generated and a command is received to print a duplicate of the hardcopy). In any case, the printing device 300 can further detect a floating signature (i.e., a widowed signature) on a signature page of the electronic document in the print job and, if necessary, can halt release of that print job to its print engine 390 until further action is taken.

Specifically, this printing device 300 can comprise at least a memory 330, a print engine 390, an output device 320 (e.g., a display screen, a communication input/output device, etc.) and a processor 350 (i.e., a controller, a central processing unit (CPU), etc.) in communication with the memory 330, the print engine 390 and the output device 320 (e.g., over a system bus 380). The memory 330 can further store a set of heuristics 340, which can be accessed and executed by the processor 350 for implementing a floating signature detection function. For purposes of this disclosure, the "set of heuristics" 340 refers specifically to a data mining software program that specifies investigative process steps, which are provided in the form of a decision tree and which can be executed by the processor 350 in order to mine the text data of an electronic document in order to ultimately determine whether that electronic document contains a floating signature. Additionally, a "floating signature" or a "widowed signature" refers to a signature block (e.g., a signature line and associated text, such as the signer's identification information) presented on the signature page of a document without additional document-specific text capable of distinguishing the signature page so that it could not be readily incorporated into a different document. In a letter, this situation can occur, for example, when a page break occurs immediately prior to the valediction (also referred to as the complimentary closing) and when no Post Script (P.S.) text is provided. This floating signature detection function can, for example, be incorporated as an option in system administrator/key operator (SA/KO) set up or, alternatively, in user set-up, and, when enabled, can be automatically triggered when a print job is received for processing. In either case, the floating signature detection function can require selective enablement or, alternatively, can be enabled by default and require selective disablement.

In any case, when the floating signature detection function is enabled on a printing device 300 and the printing device 300 receives a print job, which contains an electronic document, the processor 350 can access the set of heuristics 140 and can apply the set of heuristics 340 to the print job prior to release of the print job to the print engine 390 for printing.

Specifically, the set of heuristics 340 can comprise multiple subsets (e.g., a first sub-set 341, a second sub-set 342 and a third sub-set 343) and can be applied as follows in order to determine whether the electronic document has a signature page and, if so, to further determine whether the signature page contains a floating signature (i.e., a signature block on the signature page without additional document-specific text to distinguish that signature page and, thereby prevent the fraudulent use of that signature page). That is, the processor 350 can apply the first sub-set 341 of the set of heuristics 340 in order to identify the electronic document within the print job as a specific type of document (e.g., a letter or contract) requiring a signature, based on known text and/or formatting characteristics of one or more initial components typically found on the first page of that specific type of document. If the electronic document is a specific type of document that requires a signature, then the processor 350 can apply the second sub-set 342 of the set of heuristics 340 to identify the signature page within the electronic document, based on known text and/or formatting characteristics of one or more final components typically found on the signature page in that specific type of document. Once the signature page is identified, the processor 350 can apply the third sub-set 343 of the set of heuristics 340 to determine whether the signature page contains a floating signature, based on the known text and/or formatting characteristics of the closing components typically found on the signature page in that specific type of document.

Since the components of different types of documents vary, the set of heuristics 340 will be different for different types of documents. The following is a more detailed example of the set of heuristics 340 that can be used in the case of letters and is essentially the same example as that set out above with regard to the set of heuristics 140 applied by the computerized device 100 of FIG. 1.

Specifically, the processor 350 can apply the first sub-set 341 of the set of heuristics 340 in order to identify the electronic document within the print job as a letter, based on known text and/or formatting characteristics of, for example, salutations typically found on the first page of letters. A list of such salutations and formatting for such salutations can be contained in the first sub-set 341 of the set of heuristics 340 stored in the memory 330 and application of the first sub-set 341 of the set of heuristics 340 can comprise comparing the text data on the first page of the electronic document to the list of salutations and, if a match is found between a phrase within the text data and one of the salutations on the list and (optionally for a more accurate identification) if that phrase has the required formatting (e.g., capitalization and placement), then the electronic document can be identified as a letter. The use of salutations, as described above, is not intended to be limiting. The first pages of letters also typically have other initial components (e.g., the letter head of the sender, the address of the addressee, a regarding or attention line, etc.) and these other initial components also have known text and/or formatting characteristics. Thus, the comparison of the text data on the first page of the electronic document to the known text and/or formatting characteristics of these other initial components can, additionally or alternatively, be used to identify the electronic document as a letter.

If the electronic document is a letter, then the processor 350 can apply the second sub-set 342 of the set of heuristics 340 to identify the signature page of the letter from amongst all pages in the letter, based on known text and/or formatting characteristics of, for example, valedictions (also referred to herein as complimentary closings) typically found on the signature page of letters. A list of such valedictions and formatting for such valedictions can be contained in the second sub-set 342 of the set of heuristics 340 stored in the memory 330 and application of the second sub-set 342 of the set of heuristics 340 can comprise comparing the text data on all pages of the electronic document to the list of valedictions and, if a match is found between a phrase within the text data and one of the valedictions on the list and (optionally for a more accurate identification) if that phrase has the required formatting (e.g., capitalization and placement), then the page on which the phrase is found can be identified as the signature page. The use of valedictions, as described above, is not intended to be limiting. The signature page of a letter also typically has other final components (e.g., a signature block following the valediction, an enclosure indicator, a copies indicator, etc.) (also referred to herein as letter signature page components) and these other letter signature page components also have known text and/or formatting characteristics. For purpose of this disclosure, the signature block refers to the space following the valediction within which the sender can sign a letter as well as the sender's identification information (e.g., name, address, telephone number(s), email address and/or any other identification information). The comparison of the text data on all the pages of the electronic document to the known text and/or formatting characteristics of these other letter signature page components can, additionally or alternatively, be used to identify the signature page of the letter.

Once the signature page is identified, the processor 350 can apply the third sub-set 343 of the set of heuristics 340 to determine whether the signature page contains a floating signature based on the known text and/or formatting characteristics of the letter signature page components, as described above. Application of the third sub-set 341 of the set of heuristics 340 can comprise comparing the text data on the signature page of the letter to a list of letter signature page components and the known text and/or formatting characteristics thereof and, if all of the text on the signature page matches the known text and formatting data of a letter signature page component on the list such that none of the text on the signature page is distinguishing text, then a determination can be made that the signature page of the letter contains a floating signature. That is, if there is no other text on the signature page than text which corresponds to one of the letter signature page components on the list and, thereby no other document-specific text which could distinguish that signature page such that it could not fraudulently be incorporated into a different document, then a determination can be made that the signature page of the letter contains a floating signature.

Figure 4:
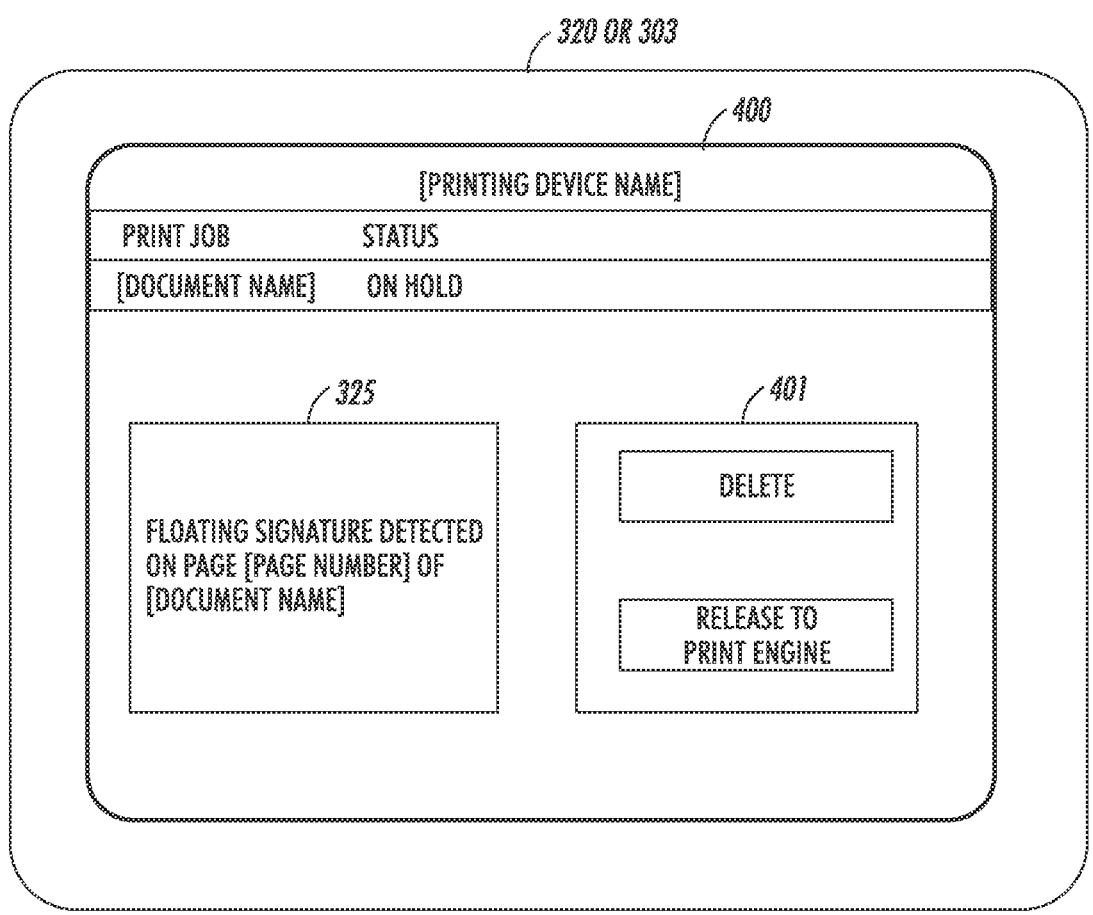
FIG. 4 is a schematic diagram illustrating an exemplary display screen of a printing device displaying a detected floating signature notification.

When the electronic document has a signature page and that signature page contains a floating signature, the processor 350 can cause the output device 320 to output a notification 325 of the floating signature to a user and can preclude release of the print job to the print engine 390, by placing the print job in an "on hold" status (e.g., in a temporary buffer), until further action is taken in response to the notification 325. For example, the output device 320 can comprise a display screen, which displays a notification 325 of the floating signature to a user. Alternatively, the output device 320 can comprise a communication input/output device (not shown) that communicates a notification (e.g. over a wired or wireless network 385) to a user (e.g., for display on a display screen 303 of a computerized device 301). As illustrated in FIG. 4, the display screen 320 of the printing device 300 (or the display screen 303 of the computerized device 301, if applicable) can display the notification 325 in a graphical user interface window 400. This graphical user interface window 400 can indicate, for example, the name of the printing device 300, the name of the print job (e.g., the name of the electronic document to be printed), the status of the print job (e.g. on hold) and a notification 325 setting forth the reason why the print job is in an on hold status (i.e., stating that a floating signature was detected). Optionally, the notification 325 can give additional details about the floating signature (e.g., the page number on which is was found). In response to a notification 325 on the display screen 303 of a computerized device 301, a user can either remotely release the print job to the print engine 390 for printing (i.e., override the on-hold status) or remotely cancel (i.e., delete) the print job, make the necessary corrections to the electronic document to remove the floating signature, and resubmit the print job to the printing device 300. In response to a notification 325 on a display screen 320 of the printing device 300 itself, a user can either locally release the print job to the print engine 390 for printing (i.e., override the on-hold status) or cancel (i.e., delete) the print job. In any case, the options for deleting the print job or releasing the print job to the printing engine 390 can be presented to the user as selectable options 401 within the graphical user interface window 400.

It should be noted that, if a determination is made during the application of the first sub-set 341 of the set of heuristics 340 that the electronic document is not a type of document that requires a signature (e.g., not a letter or contract) or if a determination is made during the application of the third sub-set 343 of the set of heuristics 340 that the signature page does not contain a floating signature, then the processor 350 can automatically release the print job to the print engine 390 of the printing device 300 for printing. That is, when the electronic document is determined to be devoid of either a signature page or a floating signature, the processor 350 can automatically release the print job to the print engine 390 of the printing device 300 for printing.

It should further be noted that, optionally, the lists of known text and/or formatting characteristics of the different components of a given type of document (e.g., the list of salutations, the list of valedictions, etc.), which are contained in the set of heuristics to identify the type of electronic document, to identify a signature page in an electronic document requiring a signature and to further detect a floating signature on a signature page, can be supplemented by a user to account for unique local or professional vernacular.

It should also be noted that the memory 330 can further store an optical character recognition (OCR) program and the processor 350 can, if necessary (e.g., if the print job is received through document handling function 302 on the printing device 300 or if the electronic document is a Portable Document Format (PDF) document) access and execute the OCR program to the electronic document in order to acquire text data before applying the set of heuristics 340 so that proper data mining can be performed.

Also disclosed herein is a method that can be implemented by a front-end computerized device 100, as discussed in detail above and illustrated in FIG. 1, to detect a floating signature (i.e., a widowed signature) on a signature page of an electronic document in a print job submitted by a user and, if necessary, to halt release of that print job to a printing device until further action is taken.

Figure 5:
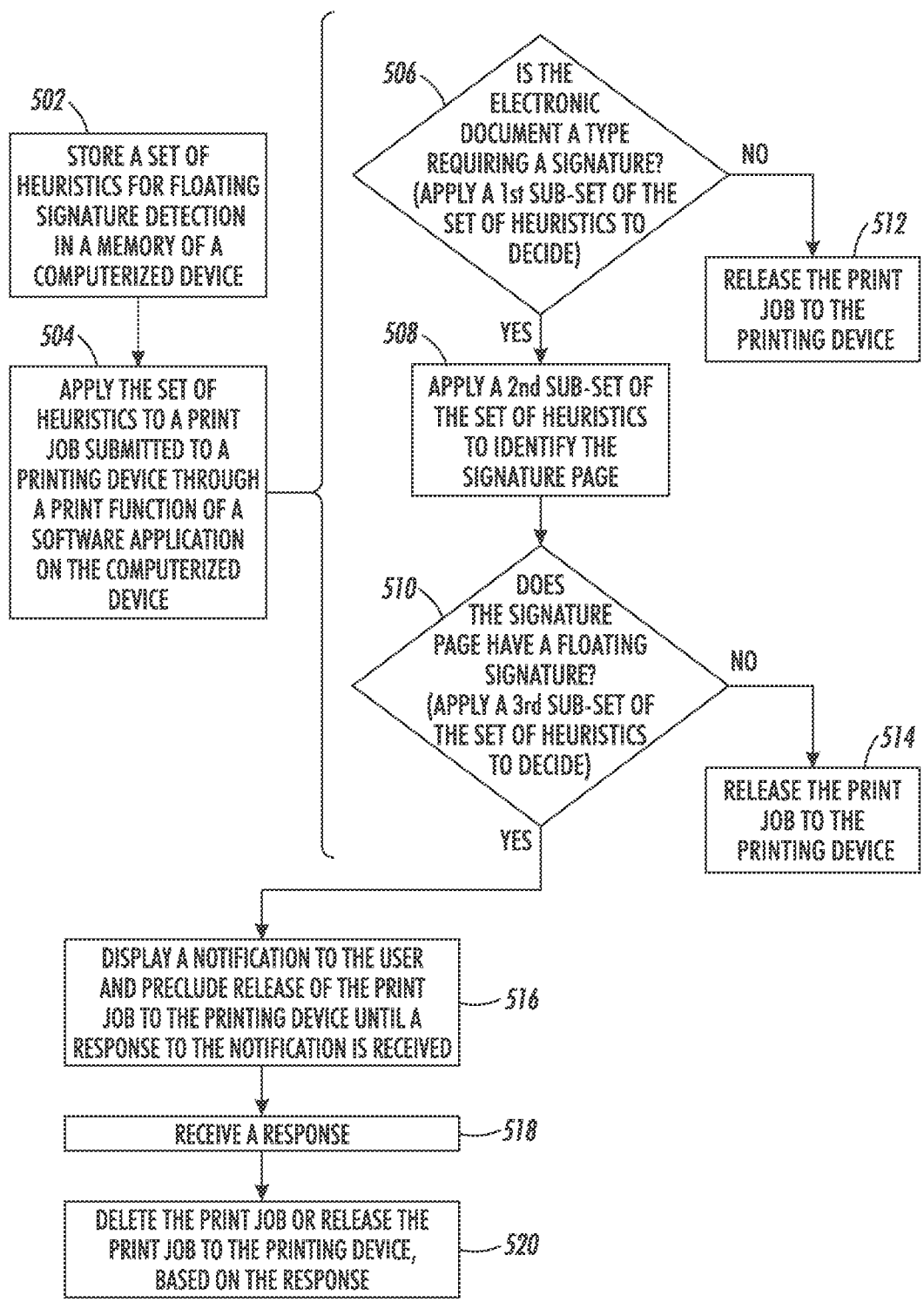
FIG. 5 is a flow diagram illustrating a method for floating signature detection implemented by the computerized device of FIG. 1.

Specifically, referring to the flow diagram of FIG. 5 in combination with FIG. 1, the method can comprise storing (e.g., in a memory 130 of a computerized device 100) a set of heuristics 140 that can be accessed and executed by a processor 150 of the computerized device 100 (502).

The method can further comprise applying (e.g., by the processor 150) the set of heuristics 140 to a print job, which has been submitted by a user 110 and contains an electronic document (504). The set of heuristics 140 can specifically be applied at process 504 in order to analyze the electronic document prior to its release to a printing device 190. This analysis process can be performed in order to determine whether the electronic document has a signature page and, if so, to further determine whether the signature page contains a floating signature (i.e., a signature block on the signature page without additional document-specific text to distinguish that signature page and, thereby prevent the fraudulent use of that signature page) (506)-(510). For purposes of this disclosure, the "set of heuristics" 140 refers to a data mining software program that specifies investigative process steps, which are provided in the form of a decision tree and which can be executed by the processor 350 in order to mine the text data of an electronic document in order to ultimately determine whether that electronic document contains a floating signature. Additionally, a "floating signature" or a "widowed signature" refers to a signature block (e.g., a signature line and associated text, such as the signer's identification information) presented on the signature page of a document without additional document-specific text capable of distinguishing the signature page so that it could not be readily incorporated into a different document. In a letter, this situation can occur, for example, when a page break occurs immediately prior to the valediction (also referred to as the complimentary closing) and when no Post Script (P.S.) text is provided.

The set of heuristics 140 applied at process 504 can comprise multiple subsets (e.g., a first sub-set 141, a second sub-set 142 and a third sub-set 143). The first sub-set 141 of the set of heuristics 140 can be applied in order to identify the electronic document within the print job as a specific type of document (e.g., a letter or contract) requiring a signature, based on known text and/or formatting characteristics of one or more initial components typically found on the first page of that specific type of document (506). If the electronic document is a specific type of document that requires a signature, then the second sub-set 142 of the set of heuristics 140 can be applied to identify the signature page within the electronic document, based on known text and/or formatting characteristics of one or more final components typically found on the signature page in that specific type of document (508). Once the signature page is identified, the third sub-set 143 of the set of heuristics 140 can be applied to determine whether the signature page contains a floating signature, based on the known text and/or formatting characteristics of the closing components typically found on the signature page in that specific type of document (510).

Since the components of different types of documents vary, the set of heuristics 140 will be different for different types of documents. The following is a more detailed example of the set of heuristics 140 that can be used in the case of letters. Specifically, the first sub-set 141 of the set of heuristics 140 can be applied at process 506 in order to identify the electronic document within the print job as a letter, based on known text and/or formatting characteristics of, for example, salutations typically found on the first page of letters. That is, the first page of a letter typically has a salutation and such salutations have known text characteristics (e.g., "Dear [Name],"; "Hi [Name],"; "Dearest [Name],"; "To whom it may concern,"; etc.,) and also known formatting characteristics (e.g., capitalized, placement at the left margin, etc.) within letters. A list of such salutations and formatting for such salutations can be contained in the first sub-set 141 of the set of heuristics 140 stored in the memory 130 and application of the first sub-set 141 of the set of heuristics 140 at process 506 can comprise comparing the text data on the first page of the electronic document to the list of salutations and, if a match is found between a phrase within the text data and one of the salutations on the list and (optionally for a more accurate identification) if that phrase has the required formatting (e.g., capitalization and placement), then the electronic document can be identified as a letter.

The use of salutations, as described above, is not intended to be limiting. The first pages of letters also typically have other initial components (e.g., the letter head of the sender, the address of the addressee, a regarding or attention line, etc.) and these other initial components also have known text and/or formatting characteristics. Thus, the comparison of the text data on the first page of the electronic document to the known text and/or formatting characteristics of these other initial components can, additionally or alternatively, be used to identify the electronic document as a letter.

If the electronic document is a letter, then the second sub-set 142 of the set of heuristics 140 can be applied at process 508 to identify the signature page of the letter from amongst all pages in the letter, based on known text and/or formatting characteristics of, for example, valedictions (also referred to herein as complimentary closings) typically found on the signature page of letters. That is, the signature page of a letter typically has a valediction and such valedictions have known text characteristics (e.g., "Sincerely,"; "Yours truly,"; "Respectfully,"; "Best Regards,"; etc.,) and also known formatting characteristics (e.g., capitalized, placement along the centerline of the document, etc.). A list of such valedictions and formatting for such valedictions can be contained in the second sub-set 142 of the set of heuristics 140 stored in the memory 130 and application of the second sub-set 142 of the set of heuristics 140 at process 508 can comprise comparing the text data on all pages of the electronic document to the list of valedictions and, if a match is found between a phrase within the text data and one of the valedictions on the list and (optionally for a more accurate identification) if that phrase has the required formatting (e.g., capitalization and placement), then the page on which the phrase is found can be identified as the signature page.

The use of valedictions, as described above, is not intended to be limiting. The signature page of a letter also typically has other final components (e.g., a signature block following the valediction, an enclosure indicator, a copies indicator, etc.) (also referred to herein as letter signature page components) and these other letter signature page components also have known text and/or formatting characteristics. For purpose of this disclosure, the signature block refers to the space following the valediction within which the sender can sign a letter as well as the sender's identification information (e.g., name, address, telephone number(s), email address and/or any other identification information). The comparison of the text data on all the pages of the electronic document to the known text and/or formatting characteristics of these other letter signature page components can, additionally or alternatively, be used to identify the signature page of the letter.

Once the signature page is identified at process 508, the third sub-set 143 of the set of heuristics 140 can be applied at process 510 to determine whether the signature page contains a floating signature based on the known text and/or formatting characteristics of the letter signature page components, as described above. That is, as mentioned above, the signature page of a letter typically has multiple components, including the valediction, the signature block, an enclosure indicator, a copies indicator, etc. and these letter signature page components have known text and/or formatting characteristics. Application of the third sub-set 141 of the set of heuristics 140 at process 510 can comprise comparing the text data on the signature page of the letter to a list of letter signature page components and the known text and/or formatting characteristics thereof and, if all of the text on the signature pages matches the known text and formatting data of a letter signature page component such that none of the text on the signature page is distinguishing text, then a determination can be made that the signature page of the letter contains a floating signature. That is, if there is no other text on the signature page than text which corresponds to one of the letter signature page components on the list and, thereby no other document-specific text which could distinguish that signature page such that it could not fraudulently be incorporated into a different document, then a determination can be made that the signature page of the letter contains a floating signature.

The method can further comprise causing the display screen 120 of the computerized device 100 to display a notification 125 of the floating signature to the user 110 and precluding release of the print job to the printing device 190 by placing the print job in an "on hold" status, until further action is taken by the user 110 in response to the notification 125 (516). For example, as illustrated in FIG. 2, a notification 125 can be displayed at process 516 in a graphical user interface window 200 on the display screen 120. This graphical user interface window 200 can indicate, for example, the name of the printing device 190, the name of the print job (e.g., the name of the electronic document to be printed), the status of the print job (e.g. on hold) and a notification 125 setting forth the reason why the print job is in an on hold status (i.e., stating that a floating signature was detected). Optionally, the notification 125 can give additional details about the floating signature (e.g., the page number on which is was found).

The method can further comprise receiving (e.g., by the processor 150) a response from the user 110 to the notification 125 and taking appropriate action based on that response (518)-(520). The response can comprise, for example, a command to cancel (i.e., delete) the print job (which can be followed by resubmission of the print job after the necessary corrections have been made to the electronic document to remove the floating signature) or, alternatively, a command to release the print job for printing (i.e., to override the on-hold status). Optionally, these options (namely, deleting the print job or releasing the print job to the printing device 190) can be presented to the user 110 as selectable options 201 within the graphical user interface window 200.

It should be noted that, if a determination is made during the application of the first sub-set 141 of the set of heuristics 140 at process 506 that the electronic document is not a type of document that requires a signature (e.g., not a letter or contract) or if a determination is made during the application of the third sub-set 143 of the set of heuristics 140 at process 510 that the signature page does not contain a floating signature, then the print job can be automatically released (e.g., by the processor 150) to the printing device 190 for printing (512) and (514). That is, when the electronic document is determined to be devoid of either a signature page or a floating signature, the print job can be automatically released to the printing device 190 for printing.

It should further be noted that, optionally, the lists of known text and/or formatting characteristics of the different components of a given type of document (e.g., the list of salutations, the list of valedictions, etc.), which are contained in the set of heuristics to identify the type of electronic document, to identify a signature page in an electronic document requiring a signature and to further detect a floating signature on a signature page, can be supplemented at process 502 by a user 110 to account for unique local or professional vernacular.

Also disclosed herein is a method that can be implemented by printing device 300, as discussed in detail above and illustrated in FIG. 3, to detect a floating signature (i.e., a widowed signature) on a signature page of an electronic document in a print job received by the printing device 300 and, if necessary, to halt release of that print job to the print engine 390 of the printing device 300 until further action is taken.

Figure 6:
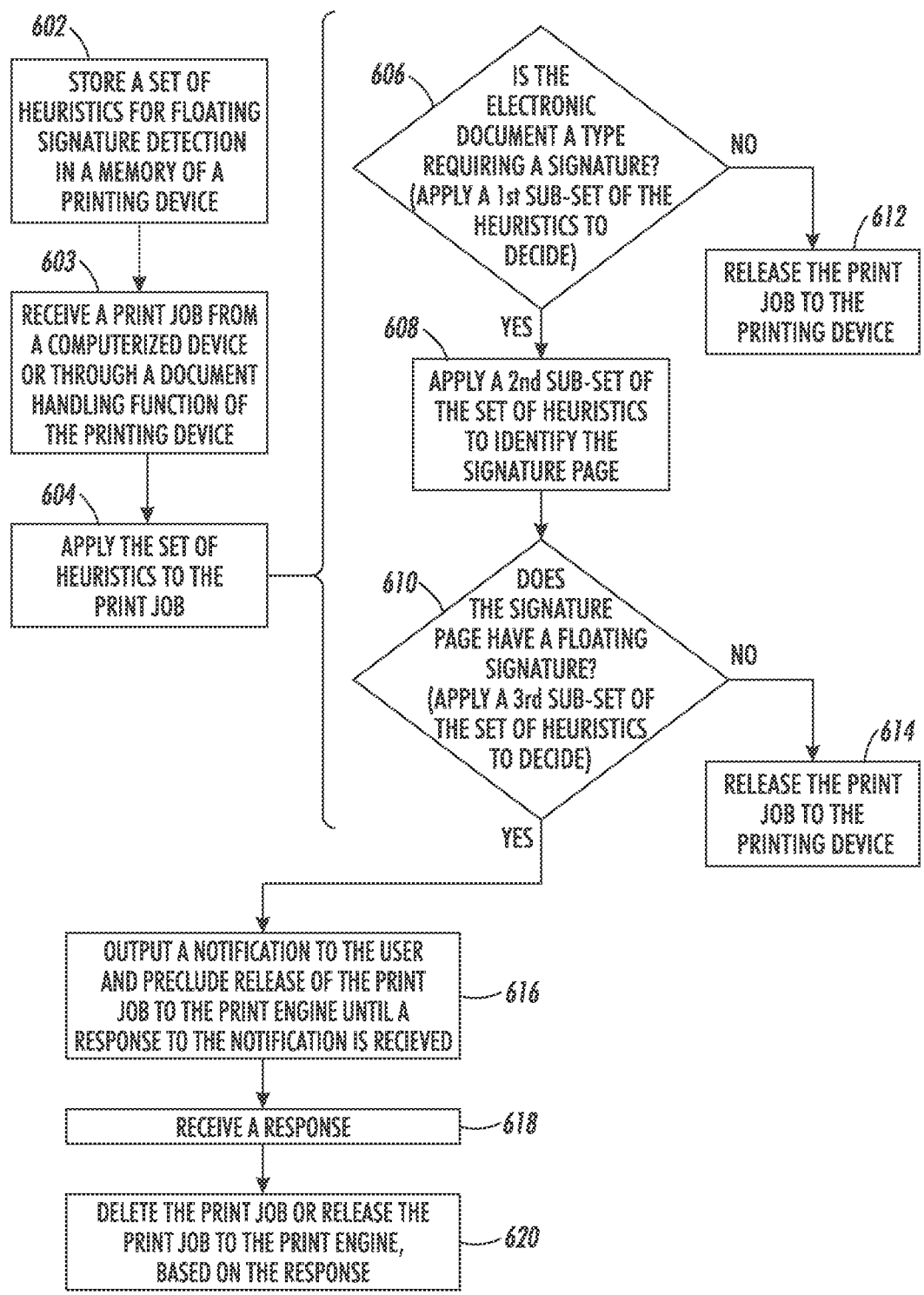
FIG. 6 is a flow diagram illustrating a method for floating signature detection implemented by the printing device of FIG. 3.

Specifically, referring to the flow diagram of FIG. 6 in combination with FIG. 3, the method can comprise storing (e.g., in a memory 330 of a printing device 300) a set of heuristics 340 that can be accessed by a processor 350 of the printing device 300 (602).

The method can further comprise receiving a print job, which comprises an electronic document, (603) and applying (e.g., by the processor 150) the set of heuristics 340 to the print job (604). The print job containing the electronic document can be received at process 603 from, for example, a computerized device 301 (e.g., a desktop computer, laptop computer, personal computer, tablet computer, netbook, PDA, print server, etc.) over a wired or wireless network 385. Alternatively, the print job containing the electronic document can be received at process 603 through a copier, scanner, or other document handling function of the printing device 300. The set of heuristics 340 can specifically be applied at process 604 in order to analyze the electronic document prior to its release to the print engine 390 of the printing device 300. This analysis process can be performed (e.g., by the process 350) in order to determine whether the electronic document has a signature page and, if so, to further determine whether the signature page contains a floating signature (i.e., a signature block on the signature page without additional document-specific text to distinguish that signature page and, thereby prevent the fraudulent use of that signature page) (606)-(610). For purposes of this disclosure, the "set of heuristics" 340 refers to a data mining software program that specifies investigative process steps, which are provided in the form of a decision tree and which can be executed by the processor 350 in order to mine the text data of an electronic document in order to ultimately determine whether that electronic document contains a floating signature. Additionally, a "floating signature" or a "widowed signature" refers to a signature block (e.g., a signature line and associated text, such as the signer's identification information) presented on the signature page of a document without additional document-specific text capable of distinguishing the signature page so that it could not be readily incorporated into a different document. In a letter, this situation can occur, for example, when a page break occurs immediately prior to the valediction (also referred to as the complimentary closing) and when no Post Script (P.S.) text is provided.

The set of heuristics 340 applied at process 604 can comprise multiple subsets (e.g., a first sub-set 341, a second sub-set 342 and a third sub-set 343). The first sub-set 341 of the set of heuristics 340 can be applied in order to identify the electronic document within the print job as a specific type of document (e.g., a letter or contract) requiring a signature, based on known text and/or formatting characteristics of one or more initial components typically found on the first page of that specific type of document (606). If the electronic document is a specific type of document that requires a signature, then the second sub-set 342 of the set of heuristics 340 can be applied to identify the signature page within the electronic document, based on known text and/or formatting characteristics of one or more final components typically found on the signature page in that specific type of document (608). Once the signature page is identified, the third sub-set 343 of the set of heuristics 340 can be applied to determine whether the signature page contains a floating signature, based on the known text and/or formatting characteristics of the closing components typically found on the signature page in that specific type of document (610).

Since the components of different types of documents vary, the set of heuristics 340 will be different for different types of documents. The following is a more detailed example of the set of heuristics 340 that can be used in the case of letters. Specifically, the first sub-set 341 of the set of heuristics 340 can be applied at process 606 in order to identify the electronic document within the print job as a letter, based on known text and/or formatting characteristics of, for example, salutations typically found on the first page of letters. A list of such salutations and formatting for such salutations can be contained in the first sub-set 341 of the set of heuristics 140 stored in the memory 330 and application of the first sub-set 341 of the set of heuristics 340 at process 606 can comprise comparing the text data on the first page of the electronic document to the list of salutations and, if a match is found between a phrase within the text data and one of the salutations on the list and (optionally for a more accurate identification) if that phrase has the required formatting (e.g., capitalization and placement), then the electronic document can be identified as a letter.

The use of salutations, as described above, is not intended to be limiting. The first pages of letters also typically have other initial components (e.g., the letter head of the sender, the address of the addressee, a regarding or attention line, etc.) and these other initial components also have known text and/or formatting characteristics. Thus, the comparison of the text data on the first page of the electronic document to the known text and/or formatting characteristics of these other initial components can, additionally or alternatively, be used to identify the electronic document as a letter.

If the electronic document is a letter, then the second sub-set 342 of the set of heuristics 340 can be applied at process 608 to identify the signature page of the letter from amongst all pages in the letter, based on known text and/or formatting characteristics of, for example, valedictions (also referred to herein as complimentary closings) typically found on the signature page of letters. A list of such valedictions and formatting for such valedictions can be contained in the second sub-set 342 of the set of heuristics 340 stored in the memory 330 and application of the second sub-set 342 of the set of heuristics 340 at process 608 can comprise comparing the text data on all pages of the electronic document to the list of valedictions and, if a match is found between a phrase within the text data and one of the valedictions on the list and (optionally for a more accurate identification) if that phrase has the required formatting (e.g., capitalization and placement), then the page on which the phrase is found can be identified as the signature page.

The use of valedictions, as described above, is not intended to be limiting. The signature page of a letter also typically has other final components (e.g., a signature block following the valediction, an enclosure indicator, a copies indicator, etc.) (also referred to herein as letter signature page components) and these other letter signature page components also have known text and/or formatting characteristics. For purpose of this disclosure, the signature block refers to the space following the valediction within which the sender can sign a letter as well as the sender's identification information (e.g., name, address, telephone number(s), email address and/or any other identification information). The comparison of the text data on all the pages of the electronic document to the known text and/or formatting characteristics of these other letter signature page components can, additionally or alternatively, be used to identify the signature page of the letter.

Once the signature page is identified at process 608, the third sub-set 343 of the set of heuristics 340 can be applied at process 610 to determine whether the signature page contains a floating signature based on the known text and/or formatting characteristics of the letter signature page components, as described above. That is, as mentioned above, the signature page of a letter typically has multiple final components, including the valediction, the signature block, an enclosure indicator, a copies indicator, etc. (also referred to herein as letter signature page components) and these letter signature page components have known text and/or formatting characteristics. Application of the third sub-set 341 of the set of heuristics 340 at process 610 can comprise comparing the text data on the signature page of the letter to a list of letter signature page components and the known text and/or formatting characteristics thereof and, if all of the text on the signature pages matches the known text and formatting data of a letter signature page component on the list such that none of the text on the signature page is distinguishing text, then a determination can be made that the signature page of the letter contains a floating signature. That is, if there is no other text on the signature page than text which corresponds to one of the letter signature page components and, thereby no other document-specific text which could distinguish that signature page such that it could not fraudulently be incorporated into a different document, then a determination can be made that the signature page of the letter contains a floating signature.

The method can further comprise, when the electronic document has a signature page and when that signature page contains a floating signature, outputting (e.g., by an output device 320 of the printing device 300) a notification 325 of the floating signature to a user and further precluding release of the print job to the print engine 390 of the printing device 300 by placing the print job in an "on hold" status, until further action is taken in response to the notification 325 (616). For example, the output device 320 can comprise a display screen and the process 616 can comprise displaying the notification 325 to a user on the display screen. Alternatively, the output device 320 can comprise a communication input/output device (not shown) and the process 616 can comprise communicating the notification 325 (e.g. over a wired or wireless network) to a user (e.g., for display on a display screen 303 of a computerized device 301). As illustrated in FIG. 4, the notification 325 can be displayed on the display screen 320 of the printing device 300 (or on the display screen 303 of the computerized device 301, if applicable) in a graphical user interface window 400. This graphical user interface window 400 can indicate, for example, the name of the printing device 300, the name of the print job (e.g., the name of the electronic document to be printed), the status of the print job (e.g. on hold) and the notification 325 setting forth the reason why the print job is in an on hold status (i.e., stating that a floating signature was detected). Optionally, the notification 325 can give additional details about the floating signature (e.g., the page number on which it was found).

The method can further comprise receiving (e.g., by the processor 350) a response from a user to the notification 325 and taking appropriate action based on that response (618)-(620). The response can comprise, for example, a command to cancel (i.e., delete) the print job (which can be followed by resubmission of the print job after the necessary corrections have been made to the electronic document to remove the floating signature) or, alternatively, a command to release the print job for printing (i.e., to override the on-hold status). Optionally, these options (namely, deleting the print job or releasing the print job to the printing device 190) can be presented to the user as selectable options 401 within the graphical user interface window 400 (regardless of whether the display screen is that of the printing device 300 itself or the display screen 303 of a computerized device 301 in communication with the printing device 300).

It should be noted that, if a determination is made during the application of the first sub-set 341 of the set of heuristics 340 at process 606 that the electronic document is not a type of document that requires a signature (e.g., not a letter or contract) or if a determination is made during the application of the third sub-set 343 of the set of heuristics 340 at process 610 that the signature page does not contain a floating signature, then the print job can be automatically released (e.g., by the processor 350) to the print engine 390 of the printing device 300 for printing (612) and (614). That is, when the electronic document is determined to be devoid of either a signature page or a floating signature, then the print job can be automatically released to the print engine 390 of the printing device 300 for printing.

It should further be noted that, optionally, the lists of known text and/or formatting characteristics of the different components of a given type of document (e.g., the list of salutations, the list of valedictions, etc.), which are contained in the set of heuristics to identify the type of electronic document, to identify a signature page in an electronic document requiring a signature and to further detect a floating signature on a signature page, can be supplemented at process 602 by a user to account for unique local or professional vernacular.

It should also be noted that, if necessary (e.g., if the print job is received through a document handling function 302 on the printing device 300 or if the electronic document is a Portable Document Format (PDF) document), the method can comprise applying an optical character recognition (OCR) program to the electronic document before applying the set of heuristics 340 so that proper data mining can be performed. Specifically, this OCR program can be stored, for example in the memory 330 and accessed and executed by the processor 350 to acquire text data for the electronic document so that the text data can subsequently be mined as described above.

Figure 7:
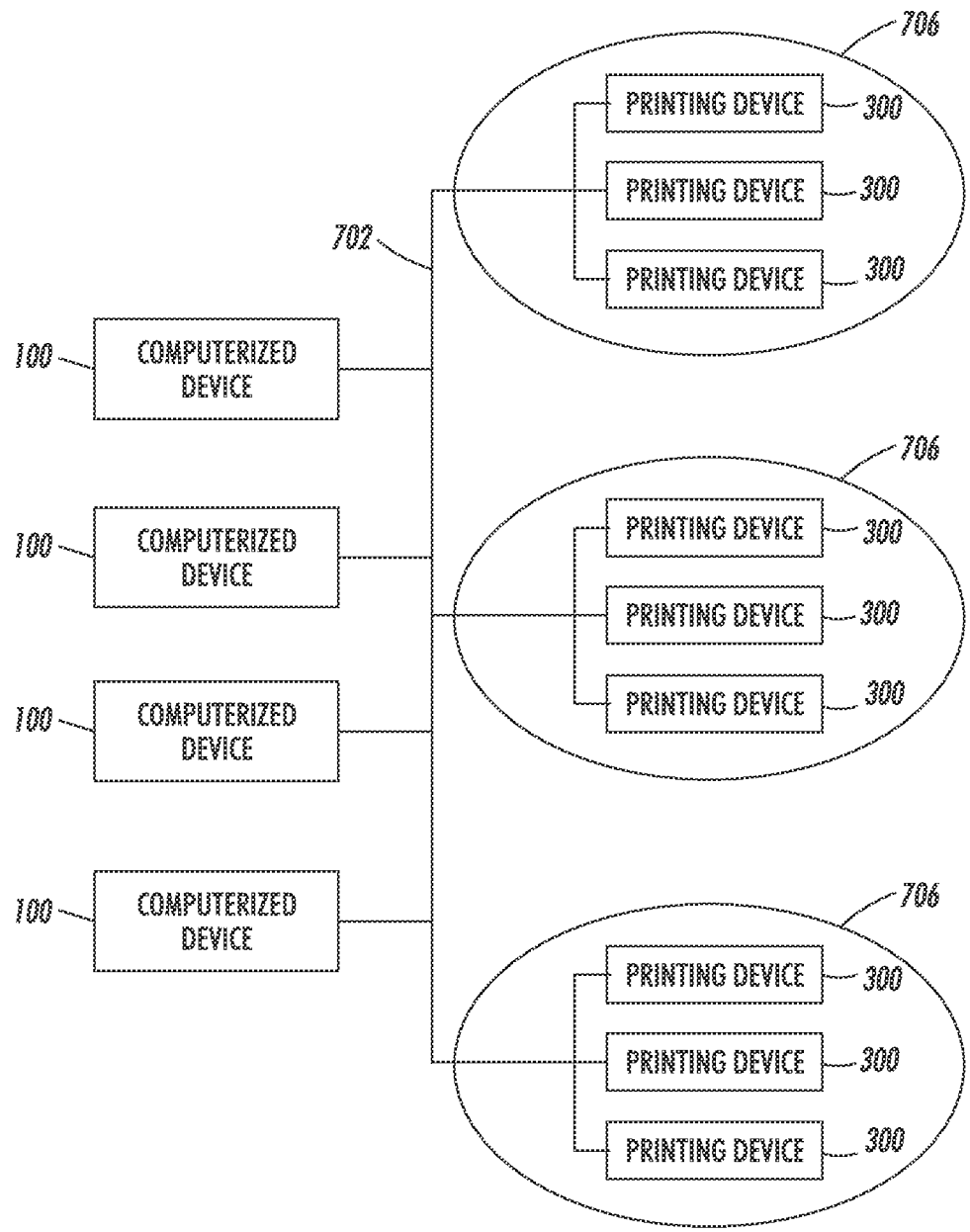
FIG. 7 is a schematic diagram illustrating an exemplary network allowing for communication between computerized device(s) and printing device(s)

As illustrated in FIG. 7, multiple computerized devices 100 and/or multiple printing devices 300, as described in detail above and illustrated in FIGS. 1 and 3, as well as the methods associated with such devices, as described in detail above and illustrated in the flow diagrams of FIGS. 5 and 6, can, for example, be located at various different locations 706 and in communication with each other over a local or wide area (wired or wireless) network 702.

Figure 8:
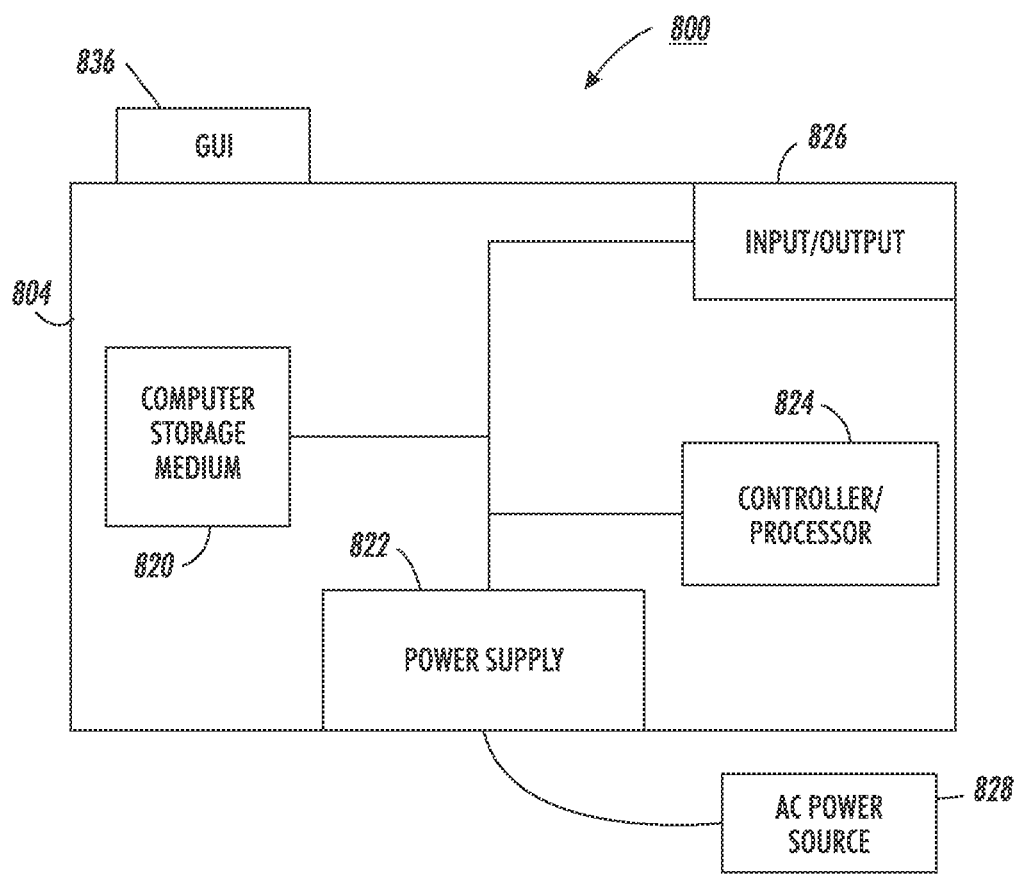
FIG. 8 is a schematic diagram illustrating an exemplary computer system that can be used to implement the computerized device of FIG. 1; and, FIG. 9 is a schematic diagram illustrating an exemplary printing device that can be used to implement the printing device of FIG. 3.

FIG. 8 illustrates an exemplary computer system 800, which can be used to implement the computerized device 100 of FIG. 1 as well as the associated method of FIG. 5. This computer system 800 can comprise at least a housing 804 and, contained within the housing 804, multiple functional components including, but not limited to, a controller/processor 824, a communications port (i.e., an input/output device) 826, and a memory (e.g., including, but not limited to, a non-transitory computer-readable storage medium 820) operatively connected (e.g., over a system bus). The computer system 800 can further comprise at least one accessory functional component, such as a graphic user interface assembly 836, in communication with the controller/processor 824 (e.g., over the system bus). The multiple functional components, including any accessory functional components, can operate on power supplied from an alternating current (AC) source 828 via an internal power supply 822. This internal power supply 822 can comprise a power storage element (e.g., a battery, etc.).

The communications port (i.e., the input/output device) 826 can be used for communications between the computer system 800 and other computerized devices and/or printing devices on a network, for example, as shown in FIG. 7. The controller/processor 824 can control the various actions of the computer system 800. The non-transitory computer-readable storage medium 820 can comprise, for example, an optical storage device, a magnetic storage device, a capacitor-based storage device or any other suitable computer-readable storage device. This computer-readable storage device can be readable by the controller/processor 824 and can store instructions (e.g., the set of heuristics 140, 340, discussed in detail above) that the controller/processor 824 can execute to allow the computer system 800 to perform its various functions and, particularly, the floating signature detection function discussed in detail above.

Figure 9:
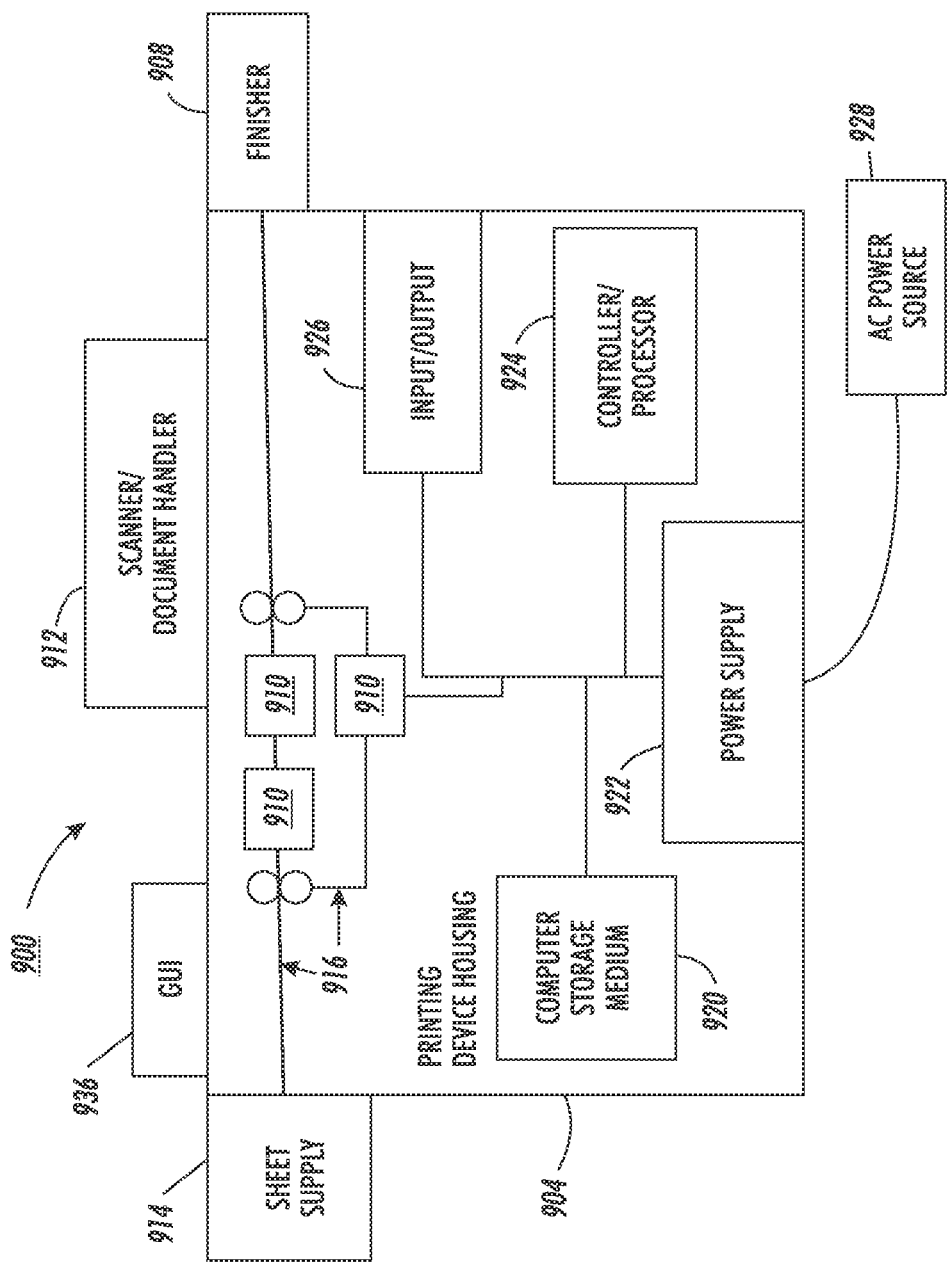

FIG. 9 illustrates an exemplary printing system 900 that can be used to implement the printing device 300 of FIG. 3 as well as the associated method of FIG. 6. The printing system 900 can comprise, for example, a printer, a copier, a multi-function device, etc. Specifically, the printing system 900 can comprise a housing 904 and, contained within the housing 904, multiple functional components including, but not limited to, a controller/processor 924, a communications port (i.e., an input/output device) 926, a memory (including, but not limited to, a non-transitory computer-readable storage medium 920), at least one print media path 916, and at least one print engine 910 (i.e., at least one marking device) operatively connected (e.g., over a system bus). The printing system 900 can further comprise multiple accessory functional components, such as a graphic user interface assembly 936, a sheet supplier 914, a document finisher 908 and a document handler 912, in communication with the controller/processor 924 (e.g., over the system bus). The multiple functional components, including any accessory functional components, can operate on power supplied from an alternating current (AC) source 928 via an internal power supply 922. This internal power supply 922 can comprise a power storage element (e.g., a battery, etc.).

The communications port (i.e., the input/output device) 926 can be used for communications between the printing system 900 and other computerized devices and/or printing devices on a network, for example, as shown in FIG. 7. The controller/processor 924 can control the various actions of the printing system 900. The non-transitory computer-readable storage medium 920 can comprise, for example, an optical storage device, a magnetic storage device, a capacitor-based storage device or any other suitable computer-readable storage device. This computer-readable storage device can be readable by the controller/processor 924 and can store instructions (e.g., the set of heuristics 140, 340 discussed in detail above) that the controller/processor 924 can execute to allow the printing system 900 to perform its various functions, such as the floating signature detection function discussed in detail above. The media path(s) 916 can be positioned to transport sheets of media from the sheet supplier 914 through the print engine(s) 910, as controlled by the controller/processor 924 (e.g., in this case, when the electronic document being printed is devoid of a signature page or floating signature or following notification of a floating signature and subsequent release to the print engine by a user). After receiving various markings from the printing engine(s) 910, the sheets of media can be transmitted to an output tray (not shown) or, optionally, to the document finisher 908, which can fold, staple, sort, etc., the various printed sheets.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

Therefore, disclosed above are devices, including both a computerized device used to submit a print job to a printing device for printing and a printing device receiving a print job to be printed. These devices can detect a floating signature (i.e., a widowed signature) on the signature page of an electronic document in the print job and can halt printing of that print job until further action is taken. Specifically, these devices can apply a set of heuristics to analyze an electronic document in a print job in order to determine whether it has a signature page and, if so, to whether the signature page contains a floating signature. When a floating signature is detected, the device notifies a user and can preclude printing of the print job until such time as a response to the notification is received. Also disclosed herein are associated methods for detecting a floating signature (i.e., a widowed signature) on the signature page of an electronic document in a print job and for halting printing of that print job until further action is taken.

What is claimed is:

1. A computerized device comprising:
   a memory storing a set of heuristics;
   a display screen; and,
   a processor in communication with said memory and said display screen,
   said processor applying said set of heuristics to analyze a print job,
   said print job comprising an electronic document,
   said electronic document being analyzed to determine whether said electronic document has a signature page with a signature block and, when said electronic document has said signature page with said signature block, to further determine whether said signature page contains a floating signature,
   said signature page containing said floating signature when all text data on said signature page matches known text and formatting characteristics of a signature page component such that said signature page is without additional document-specific text to distinguish said signature page and prevent fraudulent use of said signature page,
   said processor further precluding release of said print job to a printing device for printing, when said signature page contains said floating signature, and
   said display screen displaying a notification of said floating signature to a user, when said signature page contains said floating signature.

2. The computerized device of claim 1, said processor further automatically releasing said print job to said printing device for printing, when said electronic document is devoid of any one of said signature page and said floating signature.

3. The computerized device of claim 1, said applying, by said processor, of said set of heuristics comprising:
   applying a first sub-set of said set of heuristics to identify said electronic document as a specific type of document requiring a signature;
   applying a second sub-set of said set of heuristics to identify said signature page within said electronic document based on said specific type of document; and,
   applying a third sub-set of said set of heuristics to determine whether said signature page contains said floating signature based on said specific type of document.

4. The computerized device of claim 3, said set of heuristics being directed to letters,
   said applying of said first sub-set comprising comparing a first page of said electronic document to a list of salutations to identify said electronic document as a letter requiring said signature,
   said applying of said second sub-set comprising comparing all pages of said electronic document to a list of valedictions to identify said signature page, and
   said applying of said third sub-set comprising comparing said signature page to a list of letter signature page components to determine whether said signature page contains said floating signature.

5. The computerized device of claim 1, said display screen displaying said notification in a graphical user interface window, said graphical user interface window further presenting said user with selectable options for deleting said print job and releasing said print job.

6. A method comprising:
   analyzing, by a processor of a computerized device, an electronic document in a print job, said electronic document being analyzed to determine whether said electronic document has a signature page with a signature block and, when said electronic document has said signature page with said signature block, to further determine whether said signature page contains a floating signature, said signature page containing said floating signature when all text data on said signature page matches known text and formatting characteristics of a signature page component such that said signature page is without additional document-specific text to distinguish said signature page and prevent fraudulent use of said signature page;

precluding, by said processor, release of said print job to a printing device for printing, when said signature page contains said floating signature; and, displaying, by a display screen of said computerized device, a notification to a user, when said signature page contains said floating signature.

7. The method of claim 6, further comprising, automatically releasing, by said processor, said print job to said printing device for printing, when said electronic document is devoid of any one of said signature page and said floating signature.

8. The method of claim 6, further comprising storing, in a memory of said computerized device, a set of heuristics and said analyzing comprising applying said set of heuristics.

9. The method of claim 8, said applying of said set of heuristics comprising:
applying a first sub-set of said set of heuristics to identify said electronic document as a specific type of document requiring a signature;
applying a second sub-set of said set of heuristics to identify said signature page within said electronic document based on said specific type of document; and,
applying a third sub-set of said set of heuristics to determine whether said signature page contains said floating signature based on said specific type of document.

10. The method of claim 9, said set of heuristics being directed to letters,
said applying of said first sub-set comprising comparing a first page of said electronic document to a list of salutations to identify said electronic document as a letter requiring said signature,
said applying of said second sub-set comprising comparing all pages of said electronic document to a list of valedictions to identify said signature page, and
said applying of said third sub-set comprising comparing said signature page to a list of letter signature page components to determine whether said signature page contains said floating signature.

11. The method of claim 6, said displaying comprising displaying said notification in a graphical user interface window on said display screen, said graphical user interface window further presenting said user with selectable options for deleting said print job and releasing said print job.

12. A printing device comprising:
a memory storing a set of heuristics;
a print engine;
an output device; and,
a processor in communication with said memory, said print engine, and said output device,
said processor applying said set of heuristics to analyze a print job submitted by a user,
said print job comprising an electronic document,
said print job being analyzed to determine whether said electronic document has a signature page with a signature block and, when said electronic document has said signature page with said signature block, to determine whether said signature page contains a floating signature,
said signature page containing said floating signature when all text data on said signature page matches known text and formatting characteristics of a signature page component such that said signature page is without additional document-specific text to distinguish said signature page and prevent fraudulent use of said signature page,
said processor further precluding release of said print job to said print engine for printing, when said signature page contains said floating signature, and
said output device outputting a notification of said floating signature to said user, when said signature page contains said floating signature.

13. The printing device of claim 12, said processor further automatically releasing said print job to said print engine for printing, when said electronic document is devoid of any one of said signature page and said floating signature.

14. The printing device of claim 12, said applying, by said processor, of said set of heuristics comprising:
applying a first sub-set of said set of heuristics to identify said electronic document as a specific type of document requiring a signature;
applying a second sub-set of said set of heuristics to identify said signature page within said electronic document based on said specific type of document; and,
applying a third sub-set of said set of heuristics to determine whether said signature page contains said floating signature based on said specific type of document.

15. The printing device of claim 14, said set of heuristics being directed to letters,
said applying of said first sub-set comprising comparing a first page of said electronic document to a list of salutations to identify said electronic document as a letter requiring said signature,
said applying of said second sub-set comprising comparing all pages of said electronic document to a list of valedictions to identify said signature page, and
said applying of said third sub-set comprising comparing said signature page to a list of letter signature page components to determine whether said signature page contains said floating signature.

16. The printing device of claim 12, said output device comprising a display screen displaying said notification in a graphical user interface window, said graphical user interface window further presenting said user with selectable options for deleting said print job and releasing said print job.

17. A method comprising:
receiving, by a processor of a printing device, a print job, said print job comprising an electronic document;
analyzing, by said processor, said electronic document in order to determine whether said electronic document has a signature page with a signature block and, when said electronic document has said signature page with said signature block, to further determine whether said signature page contains a floating signature, said signature page containing said floating signature when all text data on said signature page matches known text and formatting characteristics of a signature page component such that said signature page is without additional document-specific text to distinguish said signature page and prevent fraudulent use of said signature page;
precluding, by said processor, release of said print job to a print engine of said printing device for printing, when said signature page contains said floating signature; and
outputting, by an output device of said printing device, a notification to a user, when said signature page contains said floating signature.

18. The method of claim 17, further comprising automatically releasing, by said processor of said printing device, said print job to said print engine for printing, when said electronic document is devoid of any one of said signature page and said floating signature.

19. The method of claim 17, further comprising storing, in a memory of said printing device, a set of heuristics and said analyzing comprising applying said set of heuristics.

20. The method of claim 19, said applying of said set of heuristics comprising:

applying a first sub-set of said set of heuristics to identify said electronic document as a specific type of document requiring a signature;

applying a second sub-set of said set of heuristics to identify said signature page within said electronic document based on said specific type of document; and, applying a third sub-set of said set of heuristics to determine whether said signature page contains said floating signature based on said specific type of document.

21. The method of claim 20, said set of heuristics being directed to letters, said applying of said first sub-set comprising comparing a first page of said electronic document to a list of salutations to identify said electronic document as a letter requiring said signature, said applying of said second sub-set comprising comparing all pages of said electronic document to a list of valedictions to identify said signature page, and said applying of said third sub-set comprising comparing said signature page to a list of letter signature page components to determine whether said signature page contains said floating signature.

22. The method of claim 17, said output device comprising a display screen and said outputting comprising displaying said notification in a graphical user interface window on said display screen, said graphical user interface window further presenting said user with selectable options for deleting said print job and releasing said print job.

* * * * *